Nov. 25, 1947.  L. C. EITZEN ET AL  2,431,378
VISCOSIMETER
Filed April 15, 1944
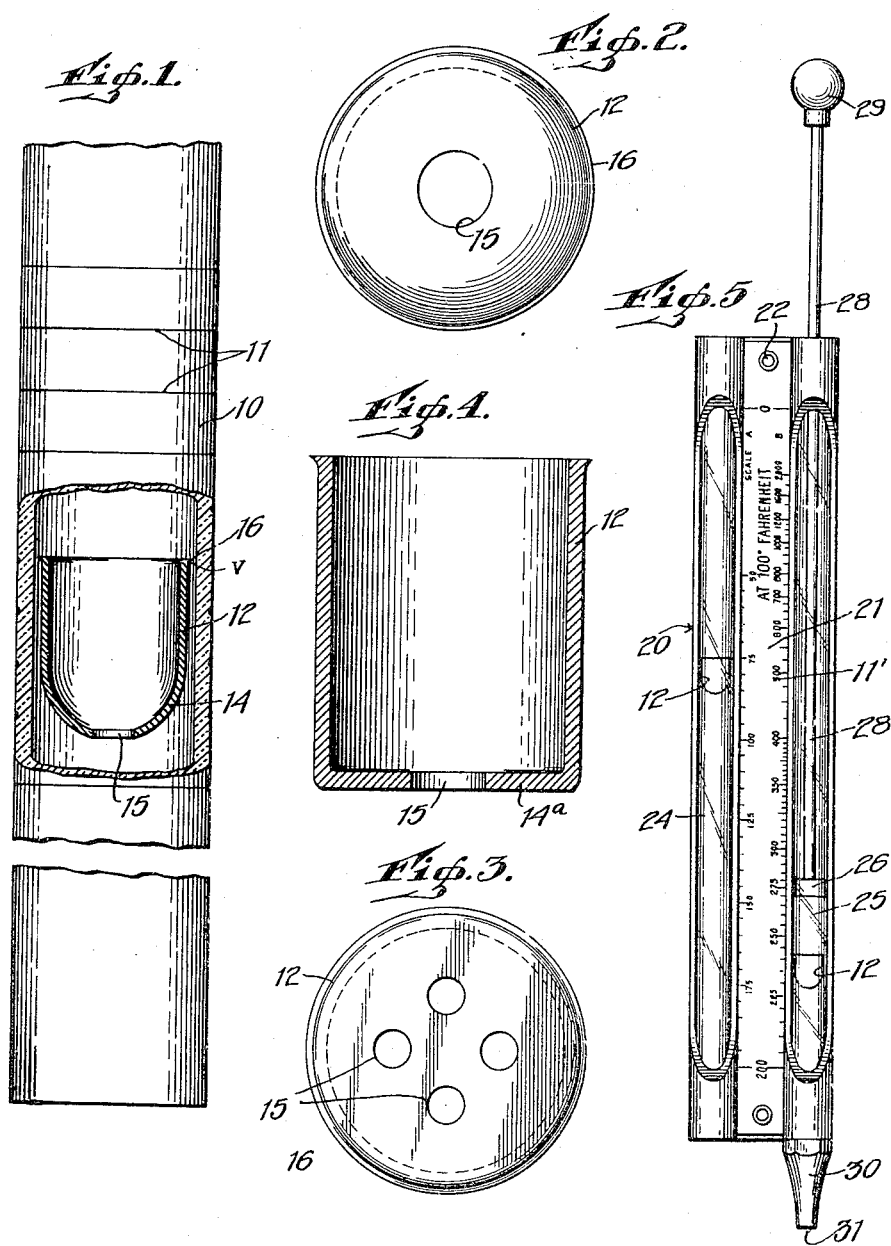
INVENTORS
Louis C. Eitzen
BY William C. Schwaderer
ATTORNEY Patented Nov. 25, 1947

2,431,378

UNITED STATES PATENT OFFICE 2,431,378

VISCOSIMETER

Louis C. Eitzen and William C. Schwaderer, New York, N. Y.; said Schwaderer assignor to said Eitzen Application April 15, 1944, Serial No. 531,166

9 Claims. (Cl. 73—57)

This invention relates to viscosimeters and to means for determining viscosities of various liquids and more particularly to apparatus and devices employing hollow falling bodies having orifices therein to pass through liquids being tested.

One object of the invention is to provide an improved device or apparatus of this kind which employs a falling orifice unit that will not roll, tumble or become canted and presents a uniform surface or area of contact with the liquid being tested, and will be large enough to be clearly visible but light enough to fall slowly so that its time of fall can be accurately determined.

Other objects of the invention are to provide an improved device of this kind which employs a falling body having self centering or guiding means thereon to constrain the body to fall or move through a static column of liquid and which is influenced by both the adhesive and cohesive properties of the liquid in a manner similar to the action in practical lubrication.

Another object of the invention is to provide an improved falling body which may be used in the tubes of viscosimeters already in use or on the market.

Additional objects of the invention are to effect simplicity and efficiency in such apparatus and to provide an extremely simple device or apparatus of this kind which is economical, durable, and reliable in operation, and economical to manufacture and convenient to use.

The inventive features for the accomplishment of these and other objects are shown herein in connection with a viscosimeter which briefly stated, includes a tube adapted to be held in a vertical position and to contain a fluid therein. A cylinder open at its upper end is disposed within the tube and is free to fall within the tube, the only resistance to the fall being the fluid within the tube, so that its rate of fall is an indication of the viscosity of the fluid.

In the accompanying drawing showing, by way of example three of many possible embodiments of the invention, Fig. 1 is an enlarged fragmental vertical sectional view showing one form of the orifice unit within a vertical tube;

Fig. 2 is a bottom plan showing the orifice unit of Fig. 1;

Fig. 3 is a bottom plan showing another form of the orifice unit;

Fig. 4 is a vertical sectional view showing another form of the orifice unit; and Fig. 5 is a front view showing a pair of viscosimeters in the form of a comparator.

The viscosimeter comprises a cylindrical trial tube or fall-tube 10 of transparent material such as glass, provided with indicia lines 11 and adapted to be disposed vertically and to contain liquid to be tested. A body is provided in said tube and free to move or fall substantially the entire length thereof impeded only by the contents therein and its rate of fall is dependent on the viscosity of the liquid within the tube. Means may be provided for holding the body in the upper end portion of the tube and for releasing it at will. Said body comprises a hollow cylindrical cup 12 or falling orifice unit open at the upper end thereof and provided with a hemispherical bottom 14 tangentially joining the upper cylindrical portion of the cup. The bottom is provided with a circular orifice 15 at the pole thereof and in axial alinement with the cup to permit a flow of liquid therethrough.

A circumferentially continuous lip 16 projects radially outwardly from the upper rim of the cup, almost touching the inner walls of the tube and is provided with a lower face beveled outwardly and upwardly at an angle of about 45 degrees. This lip performs three functions, one being to act as a fin or rudder to aid in maintaining the cup axially vertically during its fall, a second being its actions as a spacer to keep the wall of the cup from coming in line-contact with the tube walls or oil film thereon and third to engage the stagnant oil film on or near the tube walls so that the descent of the cup is not only dependent on the viscosity of the liquid mass but also on the viscosity of the liquid film, the latter being very important from a standpoint of lubrication. The cup is preferably formed of thin noncorrosive material such as white gold or platinum to be visible through the liquid to be tested and of greater density than the liquid. A cylindrical cup having a flat bottom 14a has been employed as shown in Fig. 4 with satisfactory results.

Instead of a single orifice at center or pole of the cup bottom a plurality of orifices may be provided as shown in Fig. 3. When a plurality of orifices are employed the bottom may be flat or hemispherical and it is desirable that the center of gravity of the cup lie substantially in the axis thereof so that the cup will not become canted during its descent. However it is preferable to employ a cup having only one orifice and increase the diameter of the orifice if greater flow through the bottom is desired. This is especially desirable if the oil contains bubbles of air, since air bubbles readily pass through large orifices with little effect on the descent of the cup. On the other hand if the orifice is too small to allow passage of the bubble the air will exert a buoyancy action against the cup during its descent thereby producing inaccurate results.

Our viscosimeter may be used singly or in pairs. When used singly, viscosity is indicated by the length of time for the cup to fall from one point to another through the liquid being tested under usual conditions of control.

When the viscosimeters are used in pairs, as shown in United States Patent 1,511,998, viscosity is indicated by the relative lengths of fall by similar cups in similar tubes one of which contains a liquid of known viscosity. A pair of viscosimeters so used for comparing viscosities is known as a comparator 20, Fig. 5, and comprises an elongated panel member 21 adapted to be vertically disposed and provided with a hole 22 at the upper end thereof for suspending the member in vertical position. A transparent master or reference tube 24 closed at each end and mounted on one of the edge marginal portions of the member is filled with a reference liquid of known viscosity. A transparent sample or trial tube 25 preferably of the same length as the reference tube, and open at each end, is mounted on the opposite edge marginal portion of the panel and parallel to the reference tube so as to leave the face of the panel between the tubes exposed for indicia 11'.

A piston 26 is fast on a plunger rod 28 engaging air-tight the inner wall of the sample tube; and is adapted to reciprocate substantially the length of the tube. The rod is slightly longer than the sample tube and projects from and out of one end thereof where it is provided with a handle 29. A nozzle 30 having an axial capillary 31 therethrough is mounted on the opposite end of the sample tube, whereby liquid may be drawn into or expelled from substantially the entire interior of the sample tube by reciprocatory action of the plunger and rod. One of said cups or bodies 12 is provided in each of said tubes and is free to fall substantially the entire length thereof through the liquid impeded only by the liquid in the tube.

The central flow of the liquid through the orifice or orifices will insure a vertical descent, which is not always obtainable by the falling sphere type viscosimeters due to slight lack of sphericity of balls, and discs introduce unwanted influence by falling edgewise. Again the velocity of the ball is too rapid to be observed by timing with a stopwatch and photographic and electrical chronographic devices are necessary to record the fall time. For this reason the falling-sphere method is suitable only for use with very high viscosity liquids. If the instrument is inclined and the ball allowed to roll through the liquid, the viscosity is not proportional to the roll time and calibration is troublesome.

The weight of the cup and/or dimensions of the cup and orifice may be varied according to viscosity of the liquid to be tested. For very viscous substances a heavier cup is used. Satisfactory results have been obtained using a cup having walls and bottom about .012 inch thick, .205 inch inside diameter, overall length about .280 inch, and orifice diameter of .063 inch. The lip extended about .005 inch from the outer walls of the cylinder so that in a tube of .260 inch internal diameter the average clearance was about .010 inch. The fall of the cup was consistently regular with no indication of weaving or rotation. The rate of fall through an oil having a viscosity of about 200 Saybolt Universal seconds was about seven inches in forty seconds at room temperature and for oils most commonly met with in checking crank case dilution the time for an equal amount of fall is between about 20 and 40 seconds, thus permitting greater accuracy than is possible when faster falling bodies are used.

Our cup-shaped falling body is also particularly valuable as an article of sale to be sold for use in viscosimeters already in use or on the market.

The invention claimed is:

1. A viscosimeter comprising a cylindrical tube adapted to be vertically disposed and adapted to contain liquid to be tested; a body in said tube and free to move substantially the entire length thereof impeded only by the contents therein, said body comprising a hollow cylindrical cup open at the upper end thereof and provided with a bottom having an orifice therein and a circumferentially continuous lip projecting radially from the upper rim of the cup; the height of the cup being greater than the diameter thereof.

2. A viscosimeter comprising a cylindrical tube of transparent material adapted to be vertically disposed and contain liquid to be tested; a body in said tube and free to move substantially the entire length thereof through the liquid, said body comprising a hollow cylindrical cup open at the upper end thereof and provided with a hemispherical bottom tangentially joining the upper cylindrical portion of the cup; said bottom being provided with a plurality of orifices evenly spaced from the axis of the cup; a circumferentially continuous lip projecting radially outwardly from the upper rim of the cup and almost touching the inner walls of the tube; and having its lower face beveled upwardly and outwardly at an angle of about 45 degrees; the cup being formed of thin non-corrosive material visible through the liquid to be tested and of greater density than the liquid, the height of the cup being about one sixth greater than the diameter thereof.

3. A viscosimeter comprising a cylindrical tube of transparent material adapted to be vertically disposed and contain liquid to be tested; a body in said tube and free to move substantially the entire length thereof through the liquid, said body comprising a hollow cylindrical cup open at the upper end thereof and provided with a flat bottom; said bottom being provided with an orifice in axial alinement with the cup; a circumferentially continuous lip in said tube projecting radially outwardly from the upper rim of the cup and almost touching the inner walls of the tube; and having its lower face beveled upwardly and outwardly at an angle of about 45 degrees; the cup being formed of thin non-corrosive material visible through the liquid to be tested and of greater density than the liquid, the height of the cup being greater than the diameter thereof.

4. A viscosimeter comprising a cylindrical tube of transparent material adapted to be vertically disposed and contain liquid to be tested; a body in said tube and free to move substantially the entire length thereof through the liquid; said body comprising a hollow cylindrical cup open at the upper end thereof and provided with a hemispherical bottom tangentially joining the upper cylindrical portion of the cup; said bottom being provided with an orifice at the pole thereof and in axial alinement with the cup; a circumferentially continuous lip projecting radially outwardly from the upper rim of the cup and almost touching the inner walls of the tube; and having its lower face beveled upwardly and outwardly at an angle of about 45 degrees; the cup being formed of thin noncorrosive material visible through the liquid to be tested and of greater density than the liquid, the height of the cup being about one sixth greater than the diameter thereof.

5. A device for use in a viscosimeter, said device including a thin, light, hollow substantially cup-shaped body open at the top and partly open at the bottom, and having a laterally projecting continuous lip around the extreme upper edge; the center of gravity of said device being below the geometric center of the body; all structure of said device except said lip being within the confines of a cylindrical surface determined by the outer face of the cup-shaped body.

6. A viscosimeter comprising a cylindrical tube of constant bore size and of transparent material adapted to be vertically disposed and adapted to contain liquid to be tested; a body wholly within said tube and free to move substantially the entire length thereof impeded only by the liquid contents therein, said body comprising a hollow cylindrical cup of substantially uniform material as to thickness and specific gravity and open at the upper end thereof and provided with a bottom; and a circumferentially continuous fin-like lip projecting radially outwardly from the upper rim of the cup and almost touching the inner walls of the tube; whereby the lip will substantially prevent the main body of the cup from making contact with the inner walls of the tube at more than two points and being adhered thereto and whereby rate of descent of the cup will be uniform.

7. A viscosimeter comprising a cylindrical tube of transparent material adapted to be vertically disposed and contain liquid to be tested; a body wholly within said tube and free to move substantially the entire length thereof through the liquid, said body comprising a hollow cylindrical cup open at the upper end thereof and provided with a bottom having an orifice therein; a circumferentially continuous lip projecting radially outwardly from the upper rim of the cup and almost touching the inner walls of the tube; the cup being formed of material visible through the liquid to be tested and of greater density than the liquid, the height of the cup being about one sixth greater than the diameter thereof.

8. A viscosimeter comprising a cylindrical tube of transparent material adapted to be vertically disposed and contain liquid to be tested; a body wholly within said tube and free to move substantially the entire length thereof through the liquid, said body comprising a hollow cylindrical cup open at the upper end thereof and provided with a bottom; said bottom being provided with an orifice and in axial alinement with the cup; a circumferentially continuous sharp lip projecting radially outwardly from the upper rim of the cup and almost touching the inner walls of the tube; and having its lower face bevelled upwardly and outwardly at an angle of about 45 degrees; the cup being formed of thin material visible through the liquid to be tested and of greater density than the liquid, the height of the cup being greater than the diameter thereof.

9. A viscosimeter comprising a cylindrical tube of transparent material and vertically disposed and adapted to contain liquid to be tested; a body in said tube and free to move substantially the entire length thereof impeded only by the contents therein, said body comprising a hollow cylindrical cup open at the upper end thereof and provided with an outwardly convex bottom joining the upper cylindrical portion of the cup; said bottom being provided with an orifice and in axial alinement with the cup; a circumferentially continuous lip projecting radially outwardly from the upper rim of the cup and almost touching the inner walls of the tube; the cup being formed of non-corrosive material visible through the liquid to be tested and of greater density than the liquid.

LOUIS C. EITZEN.
WILLIAM C. SCHWADERER.

REFERENCES CITED

The following references are of record in the file of this patent:

UNITED STATES PATENTS

| Number | Name | Date |
|---|---|---|
| 989,822 | Strasburger | Apr. 18, 1911 |
| 1,270,800 | Edgecomb | July 2, 1918 |
| 1,427,922 | Tiffany | Sept. 5, 1922 |
| 1,790,948 | Rodgers | Feb. 3, 1931 |
| 1,980,761 | Mock et al. | Nov. 13, 1934 |
| 2,141,329 | Zahn | Dec. 27, 1938 |
| 2,348,732 | Fischer | May 16, 1944 |

FOREIGN PATENTS

| Number | Country | Date |
|---|---|---|
| 22,042 | Great Britain | 1911 |
| 267,917 | Germany | Dec. 6, 1913 |
| 351,890 | Germany | Apr. 15, 1922 |
| 577,839 | France | June 13, 1924 |
| 483,611 | Germany | Oct. 3, 1939 |